Jan. 20, 1959  W. RUEFENACHT  2,869,854
BALANCE
Filed June 29, 1953  2 Sheets-Sheet 1
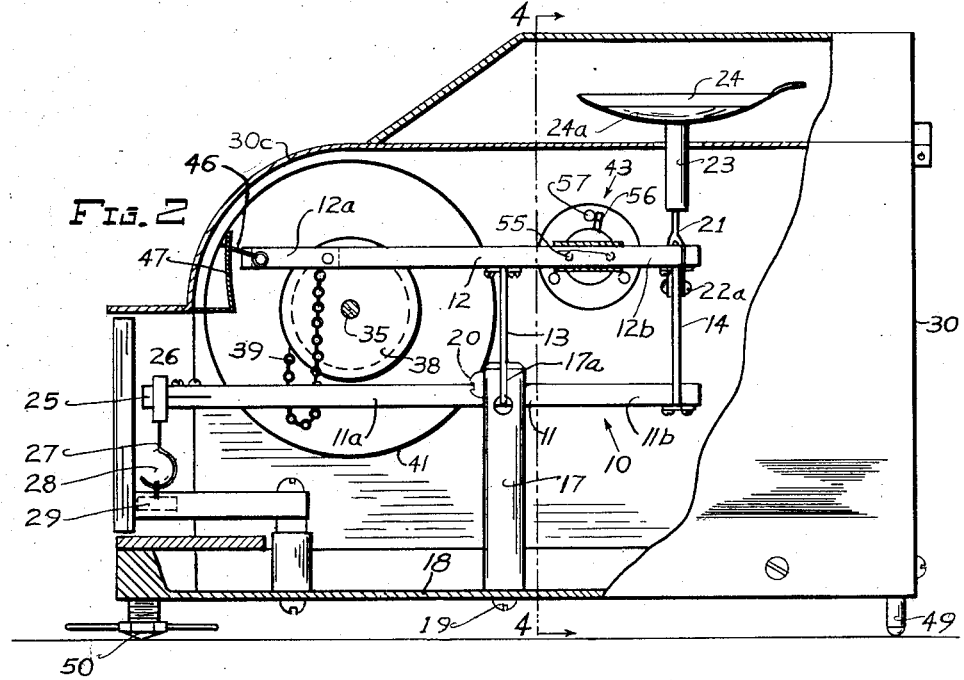
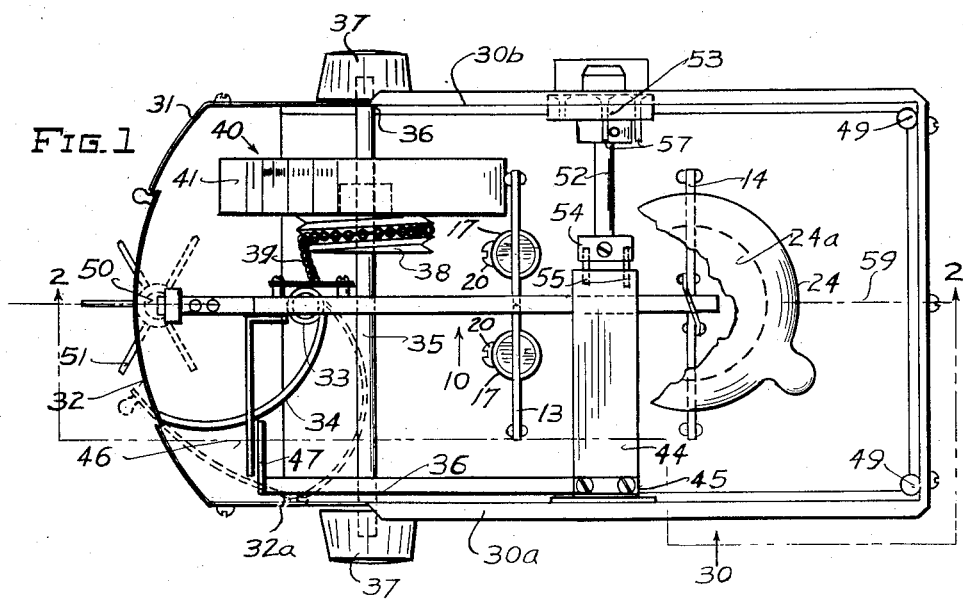
Inventor
WERNER RUEFENACHT
By
Attorneys Jan. 20, 1959   W. RUEFENACHT   2,869,854
BALANCE
Filed June 29, 1953   2 Sheets-Sheet 2
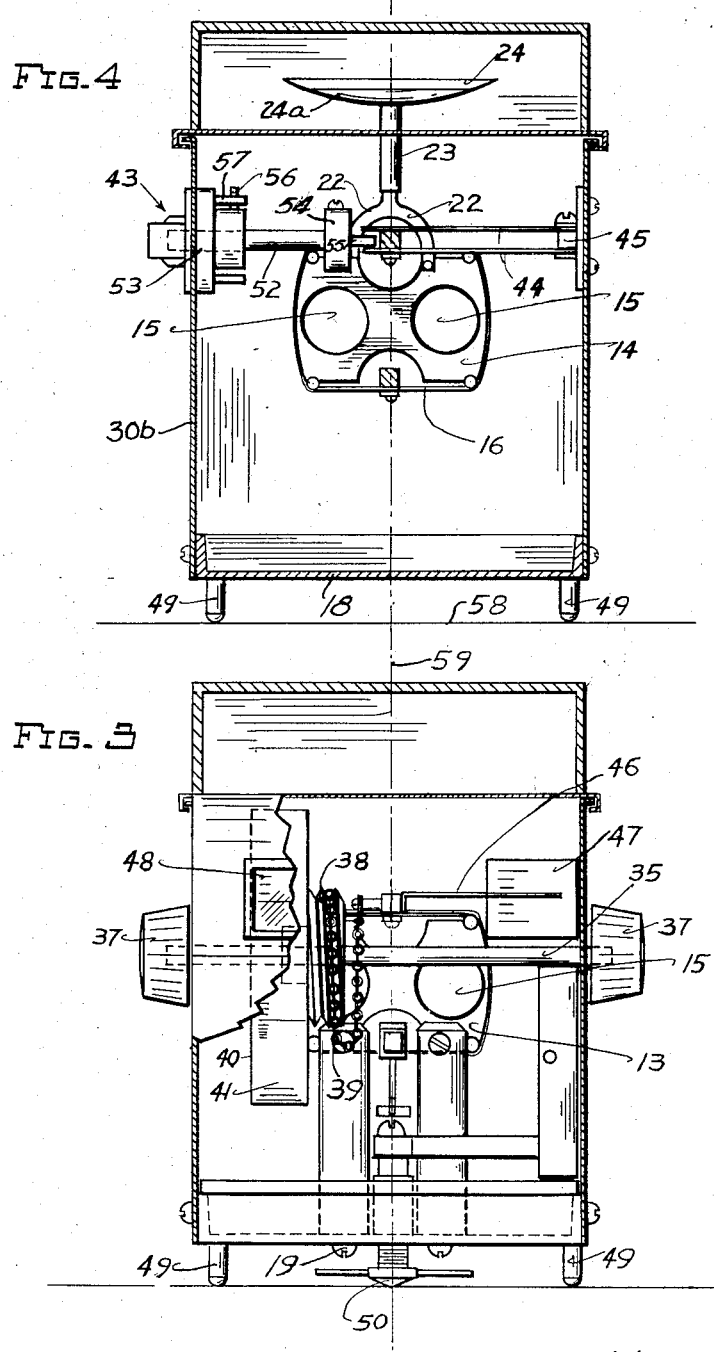
Inventor
WERNER RUEFENACHT
By
Attorneys

2,869,854

BALANCE

Werner Ruefenacht, Salt Lake City, Utah

Application June 29, 1953, Serial No. 364,623

2 Claims. (Cl. 265—49)

This invention relates to laboratory and production balances, and more particularly to a laboratory and production balance of substantially universal utility.

The principal object of the invention is to provide a near precision balance in which the balance structure is compact and convenient in arrangement and conducive to economizing the time of the user in performing weighing operations.

A feature which enables a person using an embodiment of the invention to economize time in a weighing operation resides largely in a simplified method of equilibrating the balance. This is accomplished by means of built-in structural elements so coordinated at the point of manufacture that the high degree of skill usually required in equilibrating a balance prior to each weighing operation is unnecessary. The result is that, by means of the invention, unskilled persons can equal the work of highly skilled persons using ordinary balances.

Another feature is that the adaptation of what is commonly known as a chain weight for supplying small increments for accurate weighing is combined with commonly known torsion balancing means.

In the accompanying drawings which illustrate an excellent embodiment of the invention:

Fig. 1 represents a top plan, the upper part of the casing being omitted;

Fig. 2, a longitudinal vertical section taken on the line 2—2 in Fig. 1;

Fig. 3, a front elevation, in which a considerable portion of the front wall is broken away to reveal the foreground of the interior;

Fig. 4, a vertical, transverse section taken on the line 4—4 in Fig. 2.

Balances, as usually constructed, have four levelling screws, each of which plays a part in levelling the balance casing before any weighing is attempted. Thereafter, every time the balance is used, the oscillatory system must be equilibrated by means of removable weights.

In the case of the invention, two permanently fixed resting elements, straddling the plane in which the center of oscillation of the oscillatory system is located are provided at one end of said system, while a single resting element, adjustable to the plane of oscillation, is provided at the other end of said system.

Referring to the drawings, the numeral 10 indicates a rocking or oscillating beam consisting of the lower bar 11 and the upper bar 12, these being connected together by a center truss 13 and an end truss 14. The trusses are similar to each other and contain the lightening holes 15. Each truss has a perimetral stressing band 16 by means of which the respective trusses 13 and 14 are given a torsional stress in the usual manner.

At 17 are two stationary posts secured to the base 18 in any suitable manner, for example, by means of screws 19. The upper ends of the respective posts 17 are slotted at 17a to receive the lower portion of the truss 13, which is clamped to the posts 17 by any suitable means, such as screws 20. It will be observed that the truss 13 is located at the center of oscillation and is fixed to the supports 17 on either side of the center of oscillation.

The posts 17 constitute the fulcrum for oscillating beam 10, it being noted that the center truss 13 flexes at or very near the plane of the tops of posts 17 during oscillation. Accordingly, the beam may be regarded as being fulcrumed thereat.

Mounted near the weighing end of the beam 10 is a forked member having the stem 21 and the legs 22, these being fast on the end truss 14, for example by means of the rivets 22a. If desired, the fork and the truss may be made in one piece. Removably mounted on the stem 21, for example, by means of a shank 23, is a weighing pan 24 resting in a pan holder 24a. For convenience of description, the upper bar 12 may be regarded as consisting of the two portions 12a and 12b; and the lower bar 11, as consisting of portions 11a and 11b. At the end of the portion 11a may be an extension 25 secured thereto, for example, by means of screws 26. In the extension 25 may be secured a hook 27, from which in turn may be removably suspended by means of an eyelet 28, a major weighing weight 29.

A housing or casing 30, secured on the base 18, may form a protective enclosure for the operating parts of the balance. The front wall 31 of the housing 30 may be provided with a door 32, which is centered to swing on a stationary hinge post 33, by means of a curved hinge arm 34 so as to be retractable into the casing as indicated by the dotted lines 32a. The purpose of mounting the door 32 in this manner will presently become evident.

The manner of using wrapping or chain-weight means to provide minute weight increments or decrements, such as fractional parts of a unit weight, will now be described. Journalled at 36 in the side walls 30a of the casing is a rotatable shaft 35. This shaft extends transversely through the rocking beam 10 and may be rotated manually by the means of either of two knobs 37, both knobs being fast on the shaft 35 and located on the outside of the casing. Rigidly mounted on the shaft 35, and outside of the beam 10, is a drum 38, the drum being grooved for accommodating a wrapping weight, such as a chain 39. Fixed with respect to both the shaft 35 and the drum 38 is a graduated weight-scale rim 40 forming the face of a wheel 41. The other end of the chain 39 is removably fixed to the portion 12a of the upper beam bar 12, as illustrated.

Operation

The operation of this balance after proper levelling, is, as follows:

Supposing a substance (not shown) to be weighed is placed in the pan 24, at the short arm of the beam 10. Meanwhile the entire beam 10 is held stationary by an arresting mechanism 43, composed principally of two superposed cantilever arms 44. These arms are preferably in leaf form made, for example, of flat strips of spring metal having one end thereof fixed in a bracket 45, the latter being attached to the sidewall 30a. The free ends of the cantilever arms 44, act as gripping jaws to open and close with respect to the bar portion 12b for the purpose of holding the latter stationary or to release the same if and when desired. The gripping jaws are advantageously located longitudinally apart from the center of oscillation.

Now, to ascertain the weight of the substance previously placed in the pan 24, the first move is to free the beam 10 for oscillation so as to indicate by trial, approximately the proper denomination of weight to be applied to the weight end of the beam 10 so as to balance the substance being weighed. By observation of an indicating element, such as a pointer 46, the state of near equilibration of the oscillating system is shown on an index plate 47 with which the pointer 46 is in movable registry. By rotating either of the knobs 37 in the required direction, sufficient weight in the shape of chain unwinding from or winding upon the drum 38 is added to, or subtracted from, as the case may be, the weight end of the beam 10, to establish equilibrium. When this has been done the weight of the substance in the pan 24 may be read on the scale of the indicating wheel 41. An observation window 48 is conveniently located in the curved front wall portion 30c of the casing in proper relation to the indicating wheel 41.

In the event that the chain weight is insufficient to effect balancing of the load, additional weight may be added at the hook 27.

Levelling means includes two fixed supports 49, spaced apart from each other, transversely of, and at the rear of the base 18, an adjusting element, such as a screw 50, the axis of which coincides with the vertical center plane of the oscillating system. The screw 50 in this instance is threaded in the base 18 and is provided with manually operative means, such, for illustration, as the radially extending arms 51. It is to be observed that the supports 49, by means of the rigid base 18, the rigid posts 17, the transversely fixed truss 13, and the transversely fixed connections between the truss 13 and the beam 10, render the line 58 joining the bottom tips of the supports 49 fixed in its relation to the longitudinal, vertical, center plane 59, in which the beam 10 oscillates. Therefore, it follows that a predetermined perpendicular relationship between the line 58 and the plane 59, means that any oscillatory motion of the beam 10 follows the plane 59. Obviously, equilibration of the oscillating system of the balance is effected by merely adjusting the screw 50 as the circumstances may require.

The arresting mechanism includes a shaft 52, Figs. 1 and 4, rotatably disposed in an elongated journal 53, the latter being supported in the side wall 30b. The inner end of the shaft 52 carries a cam block 54, fixed on the shaft, while the cam block has two cam pins 55, spaced apart from each other and disposed to protrude from the face of the cam block. The protruding portions of the pins 55 are sandwiched between the jaws of the cantilever arms 44 so as to normally allow the jaws to remain in the closed position, and clamp the bar 12. By turning the protruding knob of the arresting mechanism 43 in one direction, the jaws are spread apart, so as to give the bar 12 sufficient clearance for free oscillation between the jaws. By turning the knob in the opposite direction, the cantilever arms are allowed to relax, thereby again closing the jaws on the bar 12 and arresting any oscillatory motion. In order to limit the rotation of the shaft 52, the latter carries a fixed pin 56, which is limited in its arcuate movement by a stationary pin 57. The utility of the arresting device includes holding the oscillating beam stationary during the loading of the weighing pan, as well as holding the beam locked if and when the balance is packed for transportation.

In the prior art it has been necessary to arrest the entire oscillating system for each weighing adjustment. Obviously that objection is here overcome.

Wherein this invention is here illustrated and described with respect to certain preferred embodiments thereof, it should be understood that various changes may be made therein and various other constructions may be adopted on the basis of the teachings hereof, by those skilled in the art, without departing from the protective scope of the following claims.

What I claim is:

1. A balance comprising a longitudinal, oscillating beam; a fulcrum for said beam; a transverse truss disposed to fixedly support said beam upon said fulcrum; another transverse truss at one end of said beam; a weighing receptacle mounted on the second-mentioned truss; arresting means, including cantilevered leaf springs adapted to normally clamp said beam; a rotatable member; and cam means secured to said rotatable member, and sandwiched between said leaf springs, said cam means being adapted to separate said leaf springs and release said beam when said rotatable member is rotated.

2. A balance comprising a longitudinal, oscillating beam; a fulcrum for said beam; a transverse truss disposed to fixedly support said beam upon said fulcrum; another transverse truss at one end of said beam; a weighing receptacle mounted on the second-mentioned truss; arresting means, including cantilevered leaf springs adapted to normally clamp said beam; a rotatable member; and a pair of pins spaced transversely and fixed with respect to the rotative axis of said rotatable member said pins being sandwiched between said leaf springs and adapted to separate them and release said beam when said rotatable member is rotated.

References Cited in the file of this patent

UNITED STATES PATENTS

| | | |
|---|---|---|
| 789,781 | Wynne | May 16, 1905 |
| 1,104,892 | Heusser | July 28, 1914 |
| 1,121,861 | Munzer | Dec. 22, 1914 |
| 1,167,584 | Michalis | Jan. 11, 1916 |
| 1,169,929 | Conway | Feb. 1, 1916 |
| 1,562,936 | Ainsworth | Nov. 24, 1925 |
| 2,081,252 | Seederer | May 25, 1937 |
| 2,082,968 | Morris | June 8, 1937 |
| 2,181,272 | Greenleaf | Nov. 28, 1939 |
| 2,225,582 | Bible | Dec. 17, 1940 |
| 2,373,056 | Seederer | Apr. 3, 1945 |
| 2,567,161 | Griffin | Sept. 4, 1951 |
| 2,580,567 | Martin | Jan. 1, 1952 |
| 2,624,564 | Carmichael | Jan. 6, 1953 |

FOREIGN PATENTS

| | | |
|---|---|---|
| 350,590 | Great Britain | June 18, 1931 |